United States Patent
Sollinger et al.

[15] 3,648,563
[45] Mar. 14, 1972

[54] CLAMPING MEANS FOR MACHINE TOOLS, IN PARTICULAR CUTTERS

[72] Inventors: Eugen Sollinger; Ernst Gerhardtsberg, both of Olching, Germany

[73] Assignee: Carl Hurth Maschinen-und Zahnradfabrik, Munich, Germany

[22] Filed: Sept. 29, 1969

[21] Appl. No.: 861,637

[30] Foreign Application Priority Data

Oct. 3, 1968 Germany .................. P 18 00 769.7

[52] U.S. Cl. .................................................. 90/11 A, 90/1
[51] Int. Cl. ........................................ B23c 1/02, B23f 1/06
[58] Field of Search ................ 90/11 A, 20.5; 279/1 DC

[56] References Cited

UNITED STATES PATENTS

| | | | |
|---|---|---|---|
| 2,089,410 | 8/1937 | Olson | 90/11 A X |
| 3,249,015 | 5/1966 | Schuster et al | 90/11 A |

FOREIGN PATENTS OR APPLICATIONS

| | | | |
|---|---|---|---|
| 1,117,482 | 2/1956 | France | 90/11 A |

*Primary Examiner*—Gil Weidenfeld
*Attorney*—Woodhams, Blanchard and Flynn

[57] ABSTRACT

Clamping means for a machine tool, such as a gear cutter, in which the tool is fixed onto a sleeve which in turn is received onto an arbor. The sleeve is related to the arbor through two conical zones tapered in the same direction and is clamped thereon by threaded means bearing against one conical zone to urge the sleeve against a shoulder on the arbor.

8 Claims, 2 Drawing Figures

CLAMPING MEANS FOR MACHINE TOOLS, IN PARTICULAR CUTTERS

The invention relates to a clamping device for machine tools, in particular gear cutters or the like which are received on a clamping sleeve which are held and centered between two tapered or conically shaped zones by a tool spindle and a bracket and are clamped tightly by a draw-in arbor or the like.

It is known to receive a work tool, in particular a cutter for a gear-cutting machine with its bore on an arbor, to center same on the tool spindle with a receiving tapered or conically shaped zone and to clamp same tightly with an axial drawbar. The tool is centered on the arbor with a cylinder. During a changing of tools the cutter is withdrawn from the arbor which normally remains secured in the tool spindle. This clamping has the disadvantage that it is relatively difficult to withdraw the tool from the arbor, thus relatively difficult to remove same from the machine and it must be centered during the installation into the machine.

It is also known to arrange a cutter axially removably on an arbor in such a manner that the cutter is centered with two double conical zones which are provided on both sides thereof and is driven through splines engaging grooves in the arbor and in the cutter bore. This arrangement has also the disadvantage that the cutter must be adjusted in the machine.

Finally a clamping device for cutters, or a unit formed of a draw-in arbor and cutter is known, in which the tool or the mentioned unit is centered or received in the tool spindle and the bracket in such a manner that tool and unit can be mounted and demounted radially. This device has given good results because of the easy mounting thereof; however, in the case of heavy work tools the lack of radial support during installation and removal is often felt to be a deficiency.

The basic purpose of the invention is a clamping device for tools, in particular cutters, from which the tools can axially be demounted, whereby the draw-in arbor remains in the machine and is used as a support during the removal but at the same time does not hinder the removal of the tool from the arbor. Furthermore, the clamping device is constructed in such a manner that the cutter can be centered outside of the machine. Further, since dirt in the centering means results in a noncircular rotation of the cutter, an additional purpose of the invention is to provide for a simple cleaning of the receiving cones.

To attain the basic purpose of the invention, both tapered or conically shaped zones for receiving the cutter are tapered in the same direction and the tool can be pulled off axially of the draw-in arbor secured in the tool spindle.

Further, in order to provide the clamping device with desirable rigidity, the invention further provides that the tapered or conically shaped zone which is arranged on the end of the draw-in arbor facing the tool spindle is positioned on the draw-in arbor, or forms one piece with same, and extends into the conical clamping sleeve. This is also useful for obtaining the above-mentioned ease of cleaning.

For the same reason the invention provides that the end of the clamping sleeve facing the bracket is constructed as an outer cone which extends into the conical sleeve bracket.

For installation of the clamping device it is also advantageous if, according to the invention, the receiving arbor receives the tool spindle on a tapered or conically shaped zone and is axially threadedly connected with the tool spindle. The device for screwing the arbor into place can at the same time be used for pressing out the receiving arbor.

The invention is advantageously further developed so that the bracket is axially movable and removable. It is also advantageous if according to the invention the bearing sleeve is rotatably supported in the bracket.

According to the purpose of the invention the work tool is centered outside of the machine. For this purpose the tool is rotatably adjustably arranged on a clamping sleeve which is provided with the tapered or conically shaped zones for receiving the tool. The adjustment of the cutter to said cones is simplified in such a manner that the work tool is maintained axially on the clamping sleeve by two stops at least one of which has at least one pressure element, for example a setscrew, arranged eccentrically to the tool axis.

The invention is discussed in connection with FIGS. 1 and 2.

Figure 1:
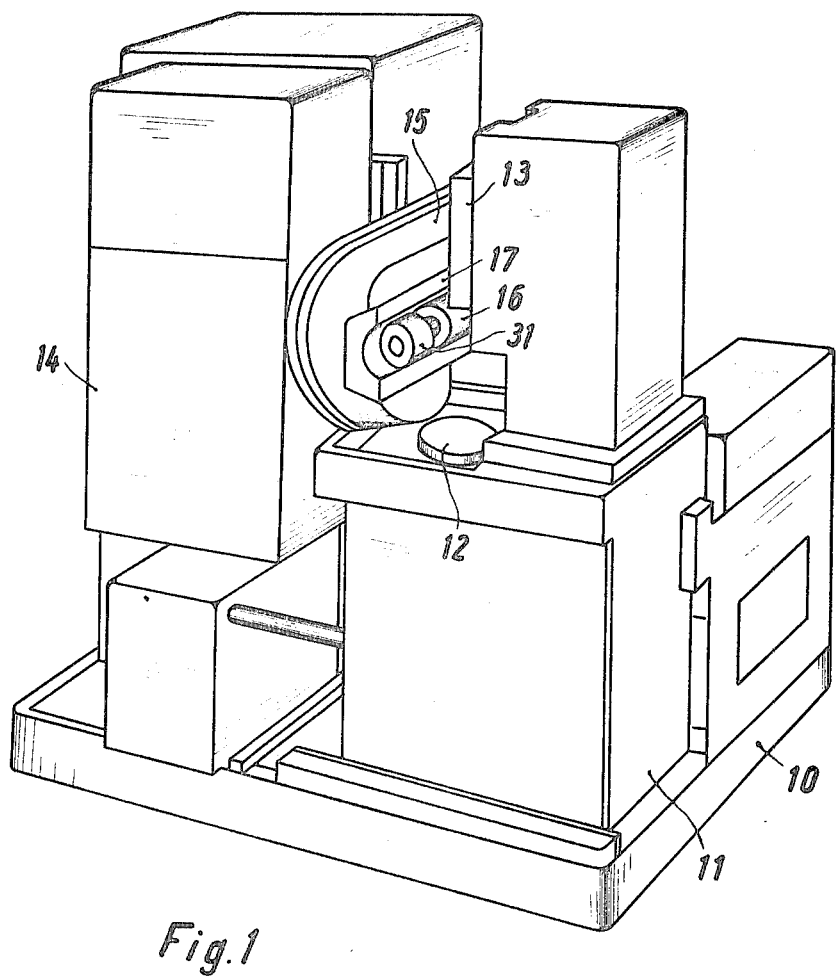
FIG. 1 illustrates as an example a gear cutting machine on which the invention is applicable.

FIG. 1 illustrates a gear cutting machine to which the invention is applied. Even though the invention has a wide field of application, it is of particular importance for the gear cutting machines. A workpiece carriage 11 is in a conventional manner movably supported and drivable on a machine frame 10. The workpiece carriage is provided with a drivable workpiece spindle 12 on which the workpiece, not illustrated, can be clamped and held by means of a tailstock 13. Furthermore a tool carriage 14 is movably and drivably supported on the machine frame, said tool carriage being provided in a known manner with a tool support 15 into which the tool in this example a gear cutter is clamped. The tool support 15 can be adjusted in a known manner to the inclination of the workpiece teeth and of the tool teeth.

Figure 2:
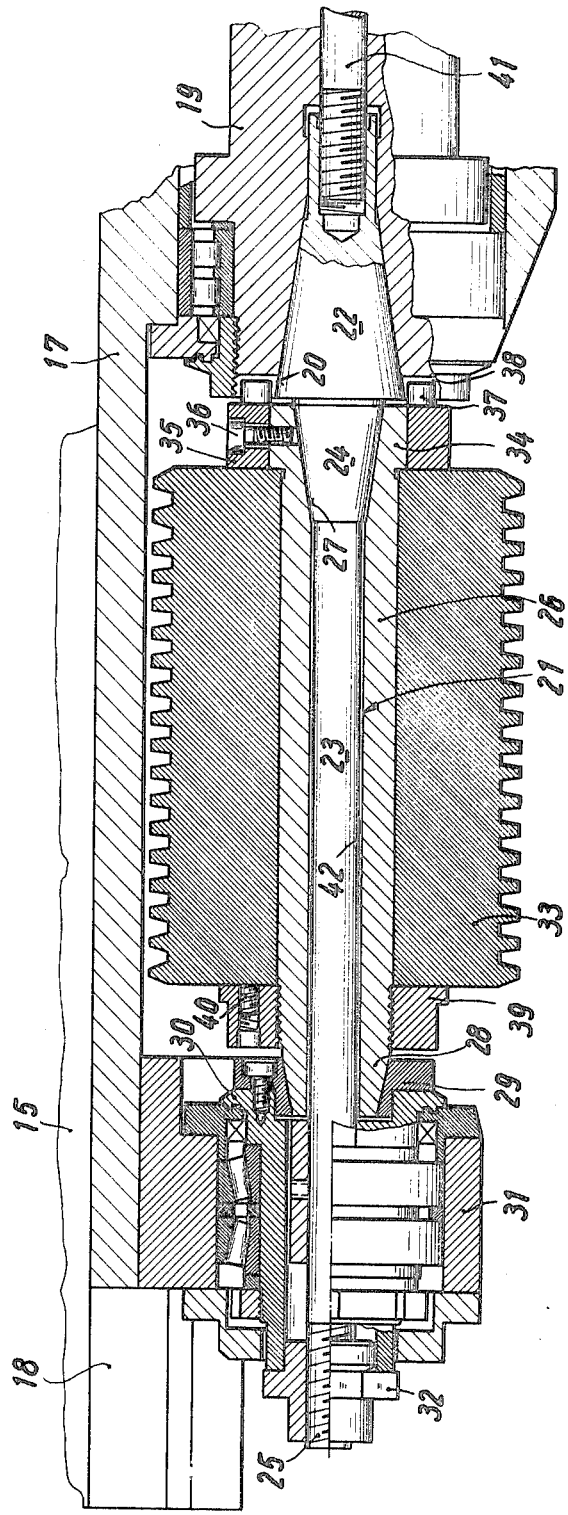
FIG. 2 illustrates in an enlarged scale a clamping device of the machine of FIG. 1 as an exemplary embodiment for the invention.

FIG. 2 illustrates in an enlarged scale the invention in detail. A tool holder 17 is movably and drivably supported in the tool support 15. The axial drive for the tool holder is not a part of the invention and is therefore not described or illustrated in detail, but is indicated generally by the lengthwise guides 18. A tool spindle 19 is rotatably and drivably supported in a known manner in the tool holder. The tool spindle is, as known, provided with a tapered or conically shaped opening 20 at its end, which opening receives a draw-in arbor 21 which for this purpose is provided with a corresponding tapered or conically shaped zone 22 which is received into the opening 20. The draw-in arbor consists of a long cylindrical shaft or clamping mandrel 23 which has a first tapered or conically shaped zone 24 which extends to and becomes the said tapered or conically shaped zone 22. The cone 22 and the first cone 24 are tapered in different directions which causes the draw-in arbor to be of a very great strength at the place which is subjected to the greatest stress. The draw-in arbor is provided with a thread 25 at its free end.

A clamping sleeve 26 is moved onto the draw-in arbor, which sleeve is provided with a first conical zone 27 on the side facing the workpiece spindle. This conical zone fits onto the cone 24. The conical sleeve is provided with a second tapered zone at its other end 28, which zone fits into a second conical sleeve 29. The conical sleeve 29 is secured to a bearing sleeve 30 or, alternatively, is integral therewith. The bearing sleeve 30 is supported rotatably but not longitudinally movably in a bracket 31. The bracket 31 is guided for longitudinal movement, that is parallel to the axis of the work tool spindle, but not rotatably and is wedgeable by means not illustrated in the work tool holder. The bearing sleeve 30, the conical sleeve 29, the sleeve 26 and the draw-in arbor 21 can be pulled together by means of a nut 32 screwed onto the thread 25.

The cutter 33 is moved onto the sleeve 26 namely up to a shoulder 34 which is used as a stop. A collar 35 is secured on the shoulder by means of screws 36 or in another suitable manner. The collar is provided with one or more projections 37 which enter into corresponding recesses 38 in the tool spindle.

The cutter is moved and held by a nut 39 against the said shoulder. At least one, preferably several, setscrews 40 are arranged around the periphery of the nut. By suitable and selective tightening of the setscrews against the cutter, selected portions of the clamping sleeve are more or less stretched. Through this an unbalance (eccentricity) can in a simple manner be eliminated from the unit consisting of clamping sleeve and cutter without the necessity which would otherwise exist of rotating the cutter relative to the sleeve. For this reason, sleeve and cutter can be secured by a wedge or by splines against relative rotation (not illustrated).

The draw-in arbor 21 is tightened axially in a known manner by means of a drawbar 41. It can also be pressed out with the drawbar.

Due to the fact that a space 42 exists between the clamping sleeve and the shaft 23 of the draw-in arbor, the unit consisting of sleeve and cutter can be easily demounted axially to the workpiece spindle after the bracket 31 is also removed axially.

A particular advantage of the invention is that the cutting tool can be balanced outside of the machine. Thus, cutting tools can, suitably balanced, be placed in storage. A further advantage is that the cone 24 remaining in the machine is the outer cone and can thus easily be cleaned before the clamping of the tool. All other centered components are removed during normal changing and can be cleaned easily outside of the machine. This fact is of great importance because dirt in the centered components can lead to eccentric rotation of the work tool which had actually been adjusted therebefore and could thus lead to a reduction in quality of the workpiece.

The embodiments of the invention in which an exclusive property or privilege is claimed are defined as follows:

1. In a machine having a frame and a rotatable tool spindle, a clamping device for rotary tools, comprising:
    a clamping mandrel connected to said tool spindle and rotatably therewith, said clamping mandrel extending axially away from said tool spindle;
    support means secured to said frame and includes means for rotatably supporting the end of said clamping mandrel remote from said tool spindle;
    a clamping sleeve mounted on said clamping mandrel and supporting a tool thereon;
    means for preventing a relative axial movement between said tool and said sleeve;
    first conical centering means for centering said clamping sleeve with respect to said clamping mandrel;
    second conical centering means for centering said clamping sleeve with respect to said support means, said first and said second centering means both tapering in the same axial direction to permit the removal of said tool and said clamping sleeve axially from said clamping mandrel; and
    means for clamping together said clamping mandrel and said support means so that said clamping sleeve having said tool thereon will be clamped therebetween and rotatable with said tool spindle.

2. Clamping device according to claim 1, wherein said first conical centering means is provided on said clamping mandrel adjacent said tool spindle; and
    wherein said clamping sleeve has a conical recess therein for the reception of said first conical centering means.

3. Clamping device according to claim 1, wherein said second conical centering means is an external conical surface provided on the end of said clamping sleeve facing said support means; and
    wherein said support means has means defining a conical recess therein for the reception of said end of said clamping sleeve.

4. Clamping device according to claim 1, wherein said tool spindle includes means defining a conically shaped recess; and
    wherein said clamping mandrel includes an external conically shaped surface thereon adapted for cooperating reception in said conically shaped recess to secure said clamping mandrel to said tool spindle.

5. Clamping device according to claim 1, including means for supporting said support means for axial movement relative to said clamping mandrel.

6. Clamping device according to claim 1, wherein said support means includes bearing means for rotatably supporting said end of said clamping mandrel remote from said tool spindle.

7. Clamping device according to claim 1, wherein said first conical centering means is provided on said clamping mandrel adjacent said tool spindle; and
    wherein said clamping sleeve has a conical recess therein for the reception of said first conical centering means; and
    wherein said second conical centering means is an external conical surface provided on the end of said clamping sleeve facing said support means; and
    wherein said support means has means defining a conical recess therein for the reception of said end of said clamping sleeve.

8. In a machine having a frame and a rotatably tool spindle, a clamping device for rotary tools, comprising:
    a clamping mandrel connected to said tool spindle and rotatably therewith, said clamping mandrel extending axially away from said tool spindle;
    support means secured to said frame and includes means for rotatably supporting the end of said clamping mandrel remote from said tool spindle;
    tool means mounted on said clamping mandrel;
    first conical centering means for centering said tool means with respect to said clamping mandrel;
    second conical centering means for centering said tool means with respect to said support means, said first and said second centering means both tapering in the same axial direction to permit the removal of said tool and said tool means axially from said clamping mandrel; and
    means for clamping together said clamping mandrel and said support means so that said tool means will be clamped therebetween and rotatable with said tool spindle.

* * * * *